United States Patent
Wu (10) Patent No.: US 10,276,128 B2
(45) Date of Patent: Apr. 30, 2019

(54) DISPLAY CONTROL METHOD, DISPLAY CONTROL DEVICE AND DISPLAY SYSTEM

(71) Applicant: BOE TECHNOLOGY GROUP CO., LTD., Beijing (CN)

(72) Inventor: Yanbing Wu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 15 days.

(21) Appl. No.: 15/324,668

(22) PCT Filed: Dec. 23, 2015

(86) PCT No.: PCT/CN2015/098374
§ 371 (c)(1),
(2) Date: Jan. 6, 2017

(87) PCT Pub. No.: WO2017/012261
PCT Pub. Date: Jan. 26, 2017

(65) Prior Publication Data
US 2017/0206858 A1  Jul. 20, 2017

(30) Foreign Application Priority Data
Jul. 17, 2015  (CN) .......................... 2015 1 0425436

(51) Int. Cl.
*B60R 1/08* (2006.01)
*B60R 1/12* (2006.01)
(Continued)

(52) U.S. Cl.
CPC .............. *G09G 5/10* (2013.01); *B60R 1/083* (2013.01); *B60R 1/12* (2013.01); *G09G 3/36* (2013.01);
(Continued)

(58) Field of Classification Search
CPC ..................................... G09G 5/10; B60R 1/12
(Continued)

(56) References Cited

U.S. PATENT DOCUMENTS 6,115,118 A * 9/2000 Dunnegan ............ G01N 21/958
348/128
6,262,787 B1 * 7/2001 Kamoi .............. G02F 1/133305
349/122
(Continued)

FOREIGN PATENT DOCUMENTS

| CN | 103543568 A | 1/2014 |
|----|-------------|--------|
| CN | 103661112 A | 3/2014 |

(Continued)

OTHER PUBLICATIONS

First Chinese Office Action, for Chinese Patent Application No. 201510425436.X, dated Jun. 28, 2017, 16 pages.
(Continued)

*Primary Examiner* — Prabodh M Dharia
(74) *Attorney, Agent, or Firm* — Kinney & Lange, P.A.

(57) ABSTRACT

A display control device and a display system are provided. The display control method includes: detecting if a glare is presented on the surface of the semi-translucent polarizing film layer on the emergent light side of the display device; generating a driving signal for driving the display device to display a non-black image in a glare compensation region if a glare is detected to be presented on the surface of the semi-translucent polarizing film layer; in which the glare compensation region corresponds to a glare region in the semi-translucent polarizing film layer and the glare region is an region in which a glare is presented. The display control method of the present disclosure may reduce glare intensity when a glare is created on a mirror surface such as a rearview mirror.

16 Claims, 4 Drawing Sheets

(51) Int. Cl.
*G09G 3/36* (2006.01)
*G09G 5/10* (2006.01)

(52) U.S. Cl.
CPC ............ B60K 2350/106 (2013.01); *B60K 2350/2013* (2013.01); *B60K 2350/2069* (2013.01); *B60K 2350/2078* (2013.01); *B60K 2350/927* (2013.01); *B60R 2001/1253* (2013.01); *G09G 2300/0456* (2013.01); *G09G 2320/0626* (2013.01); *G09G 2360/144* (2013.01); *G09G 2380/10* (2013.01)

(58) Field of Classification Search
USPC ............. 345/156, 207; 349/15, 61, 96, 123; 348/128, 148, 725, 752
See application file for complete search history.

(56) References Cited

U.S. PATENT DOCUMENTS

| | | | | |
|---|---|---|---|---|
| 9,911,395 | B1* | 3/2018 | Townsend | G09G 5/10 |
| 2003/0001987 | A1* | 1/2003 | Trapani | G02F 1/133528 349/96 |
| 2003/0152718 | A1* | 8/2003 | Hamamoto | G02B 1/105 428/1.31 |
| 2004/0212885 | A1* | 10/2004 | Mizushima | G02F 1/133528 359/489.15 |
| 2005/0007551 | A1* | 1/2005 | Wakil | A61B 3/1015 351/205 |
| 2006/0153979 | A1* | 7/2006 | Asakura | B32B 27/30 427/164 |
| 2006/0170851 | A1* | 8/2006 | Kawamoto | G02B 5/3016 349/123 |
| 2007/0222792 | A1* | 9/2007 | Matsuda | G09G 3/002 345/604 |
| 2007/0273798 | A1* | 11/2007 | Silverstein | G02B 13/22 348/752 |
| 2009/0109361 | A1* | 4/2009 | Ishii | G09G 3/3655 349/39 |
| 2010/0123839 | A1* | 5/2010 | Lu | G02B 27/2264 349/15 |
| 2011/0051052 | A1* | 3/2011 | Tasaka | C09B 31/043 349/96 |
| 2012/0069437 | A1* | 3/2012 | Bernardi | G02B 27/26 359/465 |
| 2012/0293719 | A1* | 11/2012 | Negoro | G02B 6/0068 348/725 |
| 2013/0048835 | A1* | 2/2013 | Drummond | B60R 1/088 250/208.2 |
| 2013/0058528 | A1* | 3/2013 | Liu | G06K 9/00798 382/103 |
| 2013/0128333 | A1* | 5/2013 | Agrawal | G02F 1/157 359/273 |
| 2014/0198205 | A1* | 7/2014 | Wu | G06T 7/001 348/135 |
| 2015/0022763 | A1* | 1/2015 | Kim | G02F 1/133634 349/96 |
| 2015/0083195 | A1* | 3/2015 | Gilbert | H01L 31/0525 136/248 |
| 2015/0331149 | A1* | 11/2015 | Bookbinder | G02B 1/11 359/601 |
| 2015/0362728 | A1* | 12/2015 | Tei | G02B 5/3033 353/20 |
| 2016/0070337 | A1* | 3/2016 | Cho | G06F 3/005 345/156 |
| 2016/0154276 | A1* | 6/2016 | Saitoh | G02B 5/201 349/61 |
| 2016/0257254 | A1* | 9/2016 | McCabe | B60R 1/088 |
| 2016/0343318 | A1* | 11/2016 | Wang | G09G 3/3614 |
| 2016/0357294 | A1* | 12/2016 | Ozeki | C03C 15/00 |
| 2017/0237946 | A1* | 8/2017 | Schofield | H04N 7/183 348/148 |
| 2018/0162091 | A1* | 6/2018 | Takeda | B32B 7/02 |

FOREIGN PATENT DOCUMENTS

| | | | |
|---|---|---|---|
| CN | 103723004 A | 4/2014 | |
| CN | 203666517 U | 6/2014 | |
| CN | 104065851 A | 9/2014 | |
| CN | 104166266 A | 11/2014 | |
| CN | 104183216 A | 12/2014 | |
| CN | 104977739 A | 10/2015 | |
| JP | 2788528 B2 * | 11/1991 | ............ G11B 11/10 |
| JP | 2788528 B2 * | 8/1998 | ............ G11B 11/10 |
| JP | 2011145331 A * | 7/2011 | ........... G02F 1/1335 |
| WO | 2007034469 A1 | 3/2007 | |

OTHER PUBLICATIONS

English translation of Box V of the Written Opinion dated Apr. 14, 2016, for corresponding PCT Application No. PCT/CN2015/098374.

International Search Report and Written Opinion dated Apr. 14, 2016, for corresponding PCT Application No. PCT/CN2015/098374.

* cited by examiner

DISPLAY CONTROL METHOD, DISPLAY CONTROL DEVICE AND DISPLAY SYSTEM

CROSS-REFERENCE TO RELATED APPLICATION

This application claims the benefit of Chinese Patent Application No. 201510425436.x filed on Jul. 17, 2015 in the State Intellectual Property Office of China, the whole disclosure of which is incorporated herein by reference.

BACKGROUND OF THE INVENTION

Field of the Invention

The present disclosure relates to display technology field, especially relates to a display control method, a display control device and a display system.

Description of the Related Art

The rearview mirror is one of essential accessories of the vehicle, which can clearly reflect situations of the rear, side and bottom of the vehicle, so that the driver can see these positions indirectly, and the driver's field of view can be expanded.

A surface of the rearview mirror is provided with a reflective film, which serves as a mirror reflection. However, in some cases, for example, when the vehicle is traveling under strong sunshine or when the vehicle is driving at night and a vehicle following it turns on strong light such as a high beam, an extremely strong light is reflected by the rearview mirror and a glare is created on a reflection film, resulting in that the driver cannot see the road, affecting traffic safety.

SUMMARY OF THE INVENTION

The present disclosure has been made to overcome or alleviate at least one aspect of the above mentioned disadvantages. According to embodiments of the present disclosure, there is provided a display control method, a display control device and a display system. The display control method of the present disclosure may reduce glare intensity when a glare is created on a mirror surface such as a rearview mirror.

According to an aspect of the present disclosure, there is provided a display control method, which comprises steps as follows, detecting if a glare is presented on a surface of a semi-translucent polarizing film layer on an emergent light side of a display device; generating a driving signal for driving the display device to display a non-black image at least in a glare compensation region if a glare is detected to be presented on the surface of the semi-translucent polarizing film layer. The glare compensation region corresponds to a glare region in the semi-translucent polarizing film layer and the glare region is an region in which a glare is presented.

As an alternative, the step of detecting if a glare is presented on the surface of the semi-translucent polarizing film layer on the emergent light side of the display device comprises acquiring an image of the semi-translucent polarizing film layer on the emergent light side of the display device; determining if the acquired image has a region in which a brightness value of image is greater than or equal to a preset brightness value which is a critical brightness value indicating if a glare is presented on the surface of the semi-translucent polarizing film layer.

As another alternative, the step of detecting if a glare is presented on the surface of the semi-translucent polarizing film layer on the emergent light side of the display device comprises steps as follows: detecting a photoelectric current created by ambient light irradiated onto the surface of the semi-translucent polarizing film layer on the emergent light side of the display device; determining if the created photoelectric current is greater than or equal to a preset current value which is a critical current value indicating if a glare is presented on the surface of the semi-translucent polarizing film layer.

On basis of the above, optionally, the method further comprises steps of acquiring a region parameter of the glare region; generating a driving signal according to the region parameter of the glare region, the driving signal is used for driving the display device to display the non-black image in the glare compensation region and displaying a black image in other region than the glare compensation region.

Further optionally, generating a driving signal according to the region parameter of the glare region comprises steps of generating a first driving signal and a second driving signal according to the region parameter of the glare region; wherein the first driving signal is used for driving a part of a backlight module corresponding to the glare compensation region of a display panel to be turned on and the second driving signal is used for driving the display panel to display a non-black image in the glare compensation region, or the first driving signal is used for driving the backlight module to be turned on and the second driving signal is used for driving the display panel to display a non-black image in the glare compensation region and display a black image in other region than the glare compensation region.

Further optionally, the driving signal is used for driving the display device to display an image in the glare compensation region with a brightness value at least greater than or equal to 10 nits.

Further optionally, the driving signal is used for driving the display device to display at least a white image in the glare compensation region.

According to another aspect of the present disclosure, there is provided a display control device, which comprises: a glare detecting unit for detecting if a glare is presented on a surface of a semi-translucent polarizing film layer on an emergent light side of a display device; a control unit for generating a driving signal for driving the display device to display a non-black image in a glare compensation region if a glare is detected to be presented on the surface of the semi-translucent polarizing film layer; the glare compensation region corresponds to a glare region on the semi-translucent polarizing film layer and the glare region is a region in which a glare is presented.

As an alternative, the glare detecting unit comprises an image acquiring module for acquiring an image of the semi-translucent polarizing film layer on the emergent light side of the display device, and a brightness analysis module for determining if the acquired image has an region in which a brightness value of image is greater than or equal to a preset brightness value which corresponds to a brightness value of the image when an intensity of ambient light irradiated onto the surface of the semi-translucent polarizing film layer is equal to a glare preset value.

As another alternative, the glare detecting unit comprises a light sensor module for detecting a photoelectric current created by ambient light irradiated onto the surface of the semi-translucent polarizing film layer on the emergent light side of the display device; and a signal processing module for determining if the created photoelectric current is greater than or equal to a preset current value which is a critical current value indicating if a glare is presented on the surface of the semi-translucent polarizing film layer. The preset current value is a photoelectric current value created when an intensity of the ambient light irradiated onto the surface of the semi-translucent polarizing film layer is equal to a glare preset value.

On basis of the above, optionally, the glare detecting unit further comprises a region analysis module for acquiring a region parameter of the glare region; and the control unit generates a driving signal according to the region parameter of the glare region, the driving signal is used for driving the display device to display a non-black image in a glare compensation region and displaying a black image in other region than the glare compensation region.

Further optionally, the display device comprises a display panel and a backlight module, and the control unit generates a first driving signal and a second driving signal according to the region parameter of the glare region; and the first driving signal is used for driving a part of the backlight module corresponding to a glare compensation region of a display panel to be turned on and the second driving signal is used for driving the display panel to display a non-black image in the glare compensation region, or the first driving signal is used for driving the backlight module to be turned on and the second driving signal is used for driving the display panel to display a non-black image in the glare compensation region and display a black image in other region than the glare compensation region.

Further optionally, the driving signal is used for driving the display device to display a image in the glare compensation region with a brightness value at least greater than or equal to 10 nits.

Further optionally, the driving signal is used for driving the display device to display at least a white image in the glare compensation region.

According to another aspect of the present disclosure, there is provided a display system which comprises a display device, a semi-translucent polarizing film layer on an emergent light side of the display device and a display control device as mentioned above.

Alternatively, the display system is a rearview mirror system.

Based on the above, with the mentioned display control method provided by embodiments of the present disclosure, the glare compensation region is driven to display any non-black image, when it is detected that a glare is presented on the surface of the semi-translucent polarizing film layer, such that the light transmittance of the glare region in the semi-translucent polarizing film layer is increased and the light reflectance of this region is reduced, that is, the mirror effect of the glare region is weakened and the glare intensity of the surface of the polarizing plate is reduced.

Especially when the above display control method is applied to display control of the rearview mirror of a vehicle, the glare created due to an environmental glaze or a high beam of a following vehicle shining on the surface of the rearview mirror may be weakened in time, weaken stimulation to the driver's eyes by the glare when he or she looks at the mirror, thereby enhancing traffic safety.

BRIEF DESCRIPTION OF THE DRAWINGS

In order to more clearly illustrate the embodiments of the present invention or the technical solution of the prior art, the following drawings, which will be used in the description of the embodiments or the prior art, will be simply described. It will be apparent that the drawings in the following description only show certain embodiments of the present disclosure and other drawings may be obtained by those skilled in the art without any inventive efforts.

DETAILED DESCRIPTION OF PREFERRED EMBODIMENTS OF THE INVENTION

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

It is to be noted that, unless otherwise defined, all terms (including technical and scientific terms) used in the embodiments of the present disclosure have the same meanings as commonly understood by those skilled in the art. It should also be understood that terms such as those defined in the conventional dictionary should be interpreted as having a meaning that is consistent with their meaning in the context of the related art and should not be interpreted in an idealized or highly formalized sense, unless they are explicitly stated herein.

Figure 1:
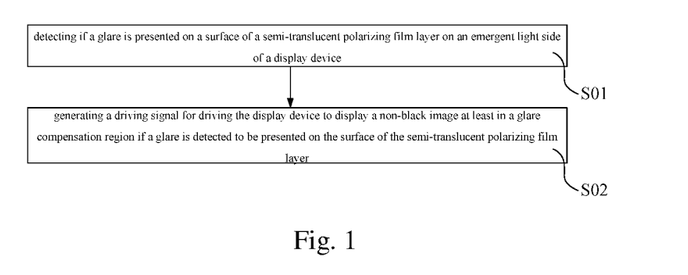
FIG. 1 is a flow chart of a display control method according to an embodiment of the present disclosure.

As shown in FIG. 1, a display control method according to an embodiment of the present disclosure comprises steps as follows:

S01, detecting if a glare is presented on a surface of a semi-translucent polarizing film layer on an emergent light side of a display device.

S02, generating a driving signal for driving the display device to display a non-black image in a glare compensation region if a glare is detected to be presented on the surface of the semi-translucent polarizing film layer.

The glare compensation region corresponds to a glare region in the semi-translucent polarizing film layer and the glare region is a region in which a glare is presented.

It should be noted that firstly, the above mentioned display device may be a liquid crystal display (LCD) or an Organic Light-Emitting Display (OLED). When the display device is a liquid crystal display (LCD), since the liquid crystal display panel itself does not emit light, a backlight module for providing a backlight to the liquid crystal display panel is included. When the display device is an OLED, since the OLED is self-luminous, the display device can be merely an OLED display panel.

Secondly, the above mentioned semi-translucent polarizing film layer may be one or more layers of optical films having a semi-translucent function. When the semi-translucent polarizing film layer is covered onto the emergent light side of the display device, it has a good mirror effect when the display device does not perform displaying (i.e., in a non-light emitting state), and exhibits a certain light transmittance in order to realize a normal display performance of the display device when the display device perform displaying (i.e., in a light emitting state).

The semi-translucent polarizing film layer may be a dual brightness enhancement film (DBEF), an advanced polarizer film (APF) or a multilayer film.

Thirdly, in the Step S02, the mirror effect of the glare region is weakened by displaying any non-black image in the glare compensation region. Generally, it is sufficient to make the glare compensation region display an image having a luminance of 10 nits or more.

Taking the display device being a LCD as an example, if the LCD panel has an overall transmittance of x %, it is sufficient to set the luminance of the backlight module to be (1000/x) nits, and the brightness of the backlight module need not be set to the maximum value, so as to save energy.

Of course, in the step S02, the driving signal may also drive the display device to display a white image in the glare compensation region. Since the light transmittance of the display device corresponding to the white image is the largest, the light reflectance of the semi-translucent polarizing film layer is smallest, that is, the mirror effect of the glare region is weakened most. Therefore, usually, the glare compensation region is made to display a white image.

Based on the above, with the mentioned display control method provided by embodiments of the present disclosure, the glare compensation region is driven to display any non-black image, when it is detected that a glare is presented on the surface of the semi-translucent polarizing film layer, such that the light transmittance corresponding to the glare region in the semi-translucent polarizing film layer is increased and the light reflectance of this region is reduced, that is, the mirror effect of the glare region is weakened and the glare intensity of the surface of the polarizing plate is reduced.

Especially when the above display control method is applied to display control of the rearview mirror of a vehicle, the glare created due to an environmental glaze or a high beam of a following vehicle shining on the surface of the rearview mirror may be weakened in time, stimulation to the driver's eyes by the glare when he or she looks at the mirror can be weaken, thereby enhancing traffic safety.

On basis of above, for the above mentioned S01, the embodiments of the present disclosure provide two optional detecting manners as follows.

Detecting if a glare is presented on the surface of the semi-translucent polarizing film layer on the emergent light side of the display device with the first detecting manner, comprising:

S11, acquiring an image of the semi-translucent polarizing film layer on the emergent light side of the display device; and S12, determining if the acquired image has a region in which the brightness value of image is greater than or equal to a preset brightness value which is a critical brightness value indicating if a glare is presented on the surface of the semi-translucent polarizing film layer.

Here, for example, a CCD (Charge-coupled Device) image sensor may be used in the first detecting manner to acquire an image of the semi-translucent polarizing film layer and perform an image analysis thereto.

When a glare is presented on the surface of the semi-translucent polarizing film layer, an image is taken. The part corresponding to the glare region in the obtained image has a brightness value which is larger than that of the other part of the image. Therefore, a parameter comparison table which shows a one-to-one correspondence between the image brightness value ($L\varphi$) and the light intensity ($I\upsilon$) may be established through a relevant simulation test, and it can be determined if a glare is presented on the surface of the semi-translucent polarizing film layer by looking up the parameter table.

Detecting if a glare is presented on the surface of the semi-translucent polarizing film layer on the emergent light side of the display device with the second detecting manner, comprising:

S21, detecting a photoelectric current created by ambient light irradiated onto the surface of the semi-translucent polarizing film layer on the emergent light side of the display device; and S22, determining if the created photoelectric current is greater than or equal to a preset current value which is a critical current value indicating if a glare is presented on the surface of the semi-translucent polarizing film layer.

Here, for example, a photo sensor, that is, a sensor which is made with the photoconductive effect of semiconductor material in which the current changes with the incident light intensity, may be used in the second detecting manner.

Similar to the first detecting manner, in the second detecting manner, a parameter comparison table which shows a one-to-one correspondence between the photocurrent value ($I_{photo}$) and the light intensity ($I\upsilon$) may be established through a relevant simulation test, and it can be determined if a glare is presented on the surface of the semi-translucent polarizing film layer by looking up the parameter table.

Figure 2:
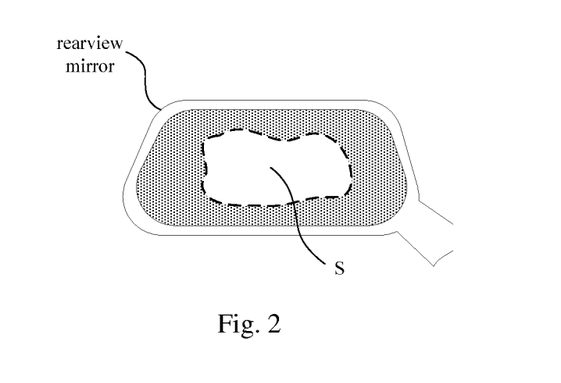
FIG. 2 is a schematic view showing the effect of a display control method according to an embodiment of the present disclosure.

On basis of the above, as shown in FIG. 2, considering that the glare region (denoted with S in the figures and hereinafter and shown here as a white pattern) merely occupies a certain region in the above-mentioned the semi-translucent polarizing film layer (a mirror film of the surface of the rearview mirror is taken as an example), while there is no glare in other regions and it is necessary to maintain the mirror effect thereof.

Further, the method comprises steps as follows: acquiring a region parameter of the glare region; accordingly, generating a driving signal in the step S02 comprises generating a driving signal according to the region parameter of the glare region, the driving signal is used for driving the display device to display a non-black image in a glare compensation region and displaying a black image in other region other than the glare compensation region.

Here, the region parameter includes coordinate information and area parameter of the glare region.

That is, when a non-black image is displayed in the glare compensation region, a black image is displayed in other regions of the display device, and the light transmittance is the smallest. Therefore, the regions in the semi-translucent polarizing film layer corresponding to the regions other than the glare compensation region has the largest light transmittance, such that it is possible to maintain a mirror effect, thus clearly reflecting the surrounding situation.

Figure 3:
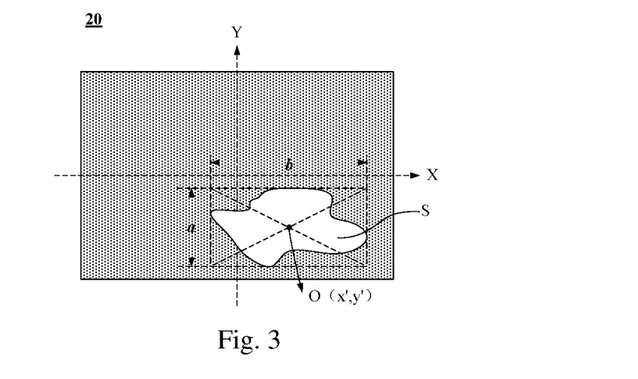
FIG. 3 is a schematic view showing acquiring a region parameter of the glare region with a display control method according to an embodiment of the present disclosure.

For example, the region parameter of the glare region can be obtained in the following manner. As shown in FIG. 3, taking a center point of the semi-translucent polarizing film layer 20 as the origin of the coordinates, and the X- and Y-axes orthogonal to each other are established on the surface of the semi-translucent polarizing film layer 20, determining coordinates (x', y') of a center point O of the glare region S, by calculating the lengths a and b of the boundary of the glare region S in the X and Y directions, the coordinate information of the glare region S can be obtained and the area of the glare region S (approximately a×b) can be calculated, or taking the center point O of the glare region S as a circle center, the size and the coordinate information of the glare region S in the surface of the semi-translucent polarizing film layer 20 can be obtained by calculating an approximate radius of the glare region S.

On basis of the above, when the display device is an OLED, as the OLED has a characteristic of self-emission, a driving signal can drive the corresponding glare compensation region to display a non-black image and drive other region than the glare compensation region to display a black image, after the driving signal is generated according to the region parameter of the glare region.

Here, making other region to display a black image may be achieved by making other region disable to display an image, or making other region display a black image.

When the display device is a LCD, generating a driving signal for driving the display device to display a non-black image merely in a glare compensation region according to the region parameter of the glare region comprises steps as follows, generating a first driving signal and a second driving signal according to the region parameter of the glare region.

When the backlight module has a local light adjustment function, for example, it is a direct-type backlight module, the first driving signal may drive a part of the backlight module corresponding to the glare compensation region of a display panel to be turned on and the second driving signal may drive the display panel to display a non-black image in the glare compensation region.

Since the first driving signal only causes the backlight corresponding to the glare compensation region to be lit up and the backlight corresponding to the other region is not lit up, other region of the display panel than the glare compensation area is not provided with a backlight and does not display, and an intuitive effect is that other region display a black image.

When the backlight module does not have local light adjustment function, for example, it is a side entry type backlight module, the first driving signal can drive the backlight module to be turned on, that is, the backlight at the incident light side of the display panel are all lit up; the second driving signal drives the display panel to display a non-black image in the glare compensation region and displays a black image in other region than the glare compensation region; that is, the display content input to the display panel is that the glare compensation region shows white color and other region shows black color.

Figure 4:
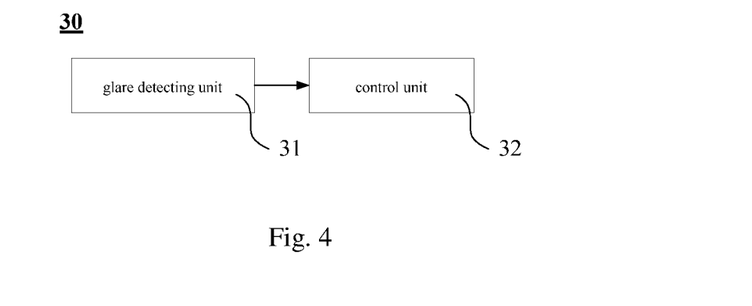
FIG. 4 is a schematic view of a display control device according to an embodiment of the present disclosure.

On basis of the above, as shown in FIG. 4, an embodiment of the present disclosure provides a display control device 30, which comprises:

a glare detecting unit 31 for detecting if a glare is presented on a surface of the semi-translucent polarizing film layer on an emergent light side of the display device;

a control unit 32 for generating a driving signal for driving the display device to display a non-black image in a glare compensation region if a glare is detected to be presented on the surface of the semi-translucent polarizing film layer. The glare compensation region corresponds to a glare region in the semi-translucent polarizing film layer and the glare region is an region in which a glare is presented.

Here, in order to ensure that an image displayed in the glare compensation region has a sufficient weakening function on the mirror effect of the semi-translucent polarizing film layer, typically, it is only necessary to make the glare compensation region to display an image having a luminance of 10 nits or more. Of course, the driving signal may also drive the glare compensation region to display a white image. Since the light transmittance of the display device is the largest, and the reflectance of the semi-translucent polarizing film layer is the smallest, that is, the mirror effect of the glare region is weakened most, when the image is white. Therefore, typically, it is to make the glare compensation region display a white image.

On basis of the above, the glare detection unit 31 can detect if a glare is presented on the surface of the semi-translucent polarizing film layer in two manners.

Figure 5:
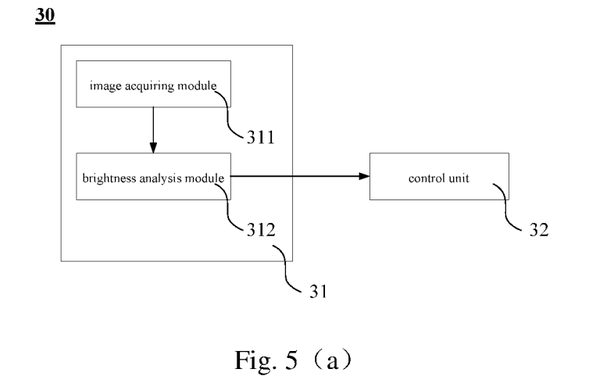
FIG. 5(a) is another schematic view of a display control device according to an embodiment of the present disclosure.
FIG. 5(b) is another schematic structural view of a display control device according to an embodiment of the present disclosure.

As an alternative manner, as shown in FIG. 5(a), the glare detecting unit 31 comprises an image acquiring module 311 and a brightness analysis module 312.

The image acquiring module 311 is used for acquiring an image of the semi-translucent polarizing film layer on the emergent light side of the display device.

For example, the image acquiring module 311 may be a photographing device such as a CCD.

The brightness analysis module 312 is used for determining if the acquired image has a region in which the brightness value of image is greater than or equal to a preset brightness value which is a critical brightness value indicating if a glare is presented on the surface of the semi-translucent polarizing film layer.

For example, the brightness analysis module 312 may be an image analyzer, a processor, or the like.

As another alternative manner, as shown in FIG. 5(b), the glare detecting unit 31 comprises a light sensor module 321 and a signal processing module 322.

The light sensor module 321 is used for detecting a photoelectric current created by ambient light irradiated onto the surface of the semi-translucent polarizing film layer on the emergent light side of the display device.

For example, the light sensor module 321 may be a light sensor and the like.

The signal processing module 322 is used for determining if the created photoelectric current is greater than or equal to a preset current value which is a critical current value indicating if a glare is presented on the surface of the semi-translucent polarizing film layer.

Figure 6:
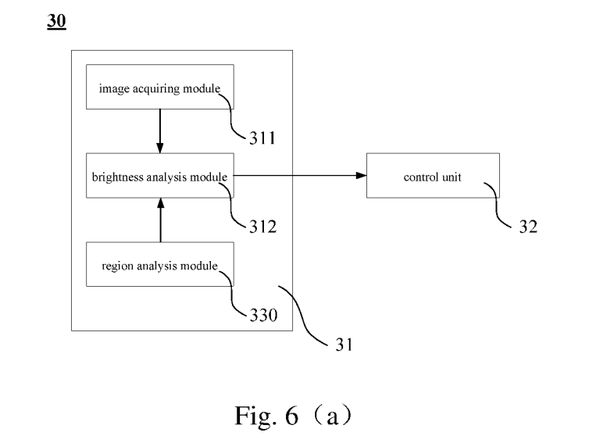
FIG. 6(a) is another schematic view of a display control device according to an embodiment of the present disclosure.
FIG. 6(b) is another schematic view of a display control device according to an embodiment of the present disclosure.
Figure 6B:
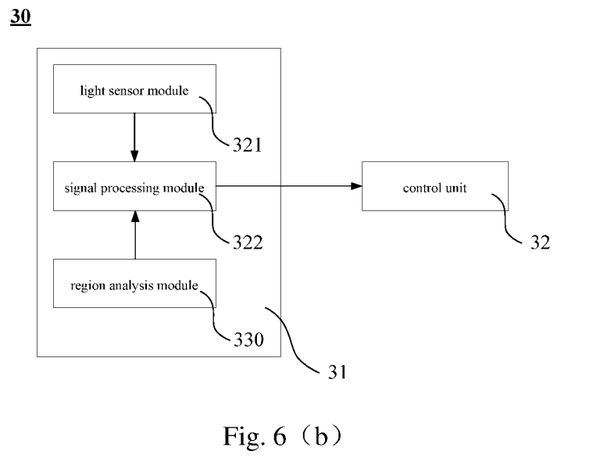

On basis of the above, as shown in FIG. 6(a) or 6(b), the glare detecting unit 31 further comprises a region analysis module 330 for acquiring a region parameter of the glare region.

Figure 7:
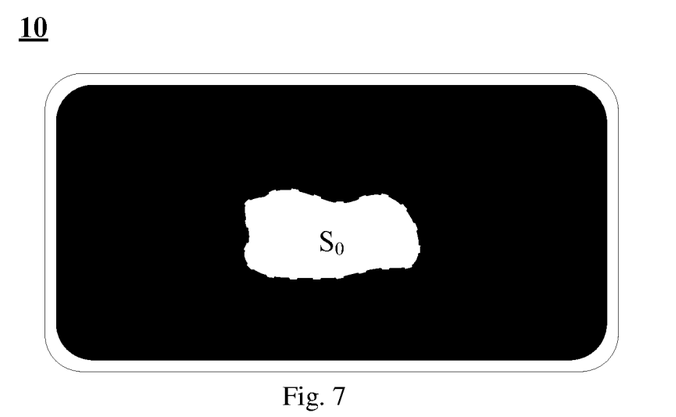
FIG. 7 is a schematic view showing the effect of a display control device according to an embodiment of the present disclosure.

As shown in FIG. 7, a driving signal is used to drive the display device 10 to display a non-black image in a glare compensation region (denoted with $S_0$ in the figure and taking a white image for example), and a black image in other region than the glare compensation area $S_0$.

On basis of the above, when the display device is an OLED, as the OLED has a characteristic of self-emission, a driving signal can drive the corresponding glare compensation region to display a non-black image and drive other region than the glare compensation region to display a black image, after the driving signal is generated according to the region parameter of the glare region.

Here, making other region to display a black image may be achieved by making other region disable to display an image, or making other region display a black image.

When the display device is a LCD, generating a driving signal comprises generating a first driving signal and a second driving signal.

When the backlight module has a local light adjustment function, for example, it is a direct-type backlight module, the first driving signal may drive a part of the backlight module corresponding to the glare compensation region of a display panel to be turned on and the second driving signal may drive the display panel to display a non-black image in the glare compensation region.

Since the first driving signal only causes the backlight corresponding to the glare compensation region to be lit up and the backlight corresponding to the other region is not lit up, other region of the display panel than the glare compensation area is not provided with a backlight and does not display, and an intuitive effect is that other region displays a black image.

When the backlight module does not have local light adjustment function, for example, it is a side backlight module, the first driving signal can drive the backlight module to be turned on, that is, the backlight at the incident light side of the display panel are all lit up; the second driving signal drive the display panel to display a non-black image in the glare compensation region and display a black image in other region than the glare compensation region; that is, the display content input to the display panel is that the glare compensation region shows white color and other region shows black color.

Figure 8:
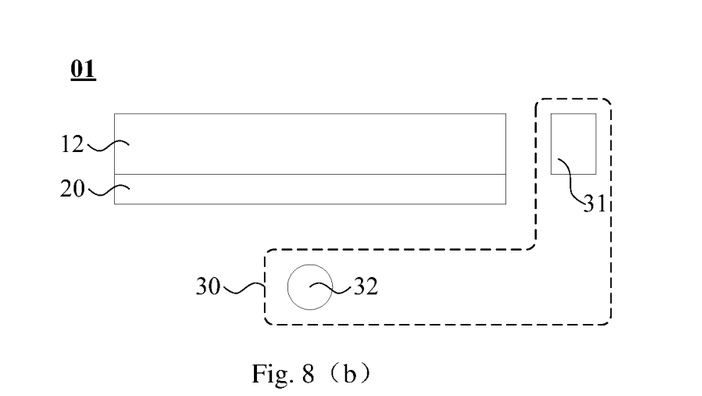
FIG. 8(a) is a schematic view of a display system according to an embodiment of the present disclosure.
FIG. 8(b) is another schematic view of a display system according to an embodiment of the present disclosure.
Figure 8A:
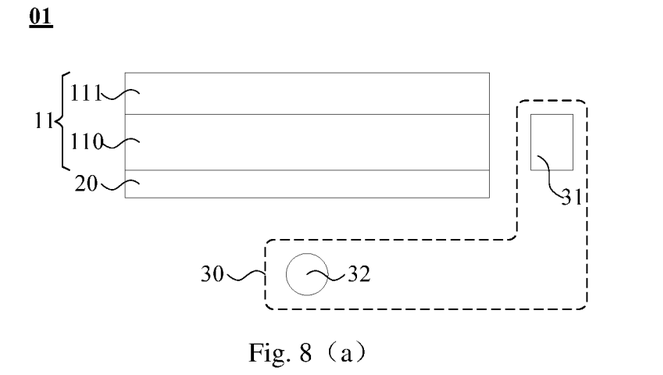

On basis of the above, embodiments of the present disclosure also provide a display system 01, as shown in FIG. 8(a) or 8(b), the display system comprises a display device, a semi-translucent polarizing film layer 20 on the emergent light side of the display device and the above mentioned display control device 30.

Here, as shown in FIG. 8(a), when the display device is a liquid crystal display device 11, it comprises a display panel 110 and a backlight module 111, or as shown in FIG. 8(b), the display device is an organic light-emitting display (OLED) 12.

Further, the above mentioned display system 01 is a rearview mirror system.

Here, the display device 10 in the display system 01 and the semi-translucent polarizing film layer 20 on the emergent light side of the display device constitute a rearview mirror of a vehicle.

The rearview mirror may be a left or right rearview mirror located outside the vehicle, or may be an interior rearview mirror located inside the vehicle. The position of the display control device 30 in the display system 01 may be arbitrary as long as the above-described display control function can be implemented, and the embodiments of the present invention do not make any limitation about that.

Here, by selecting on or off of the display device 10 and the display control device 30, the rearview mirror system may achieve various functions such as:

When both the display device 10 and the display control device 30 are not turned on, the rearview mirror system is in a mirror state, and the driver can visually recognize the situations of the rear and lateral side of the vehicle or the like indirectly through the semi-translucent polarizing film layer 20.

When the display device 10 is turned on and the display control device 30 is turned off, the rearview mirror system is in a display state, and can display images such as a map, a reverse image, according to the driver's use requirements.

Figure 9:
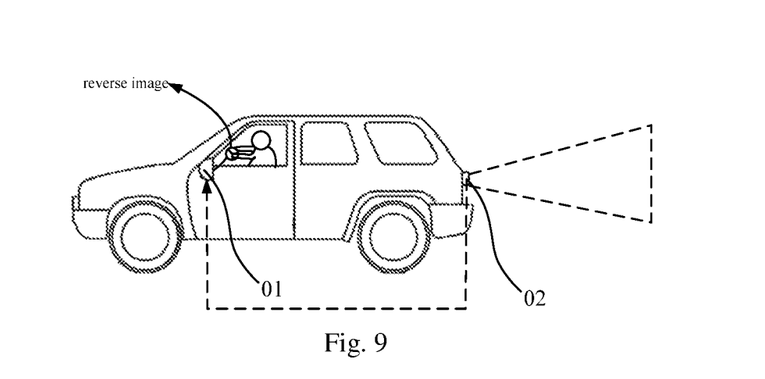
FIG. 9 is a schematic view showing that the display system according to an embodiment of the present disclosure is applied to an automobile.

As shown in FIG. 9, when it is desired to display the reverse image with the rearview mirror system, a high-definition reverse camera 02 may be provided at the rear part of the vehicle to capture the situation at the rear of the vehicle and transmit it to the display device 10 via a transmission such as Bluetooth, and the situation at the rear of the vehicle is displayed on the display device 10 in real time.

When the display device 10 and the display control device 30 are both turned on, the rearview mirror system is in a glare detection state, and the presence of a glare on the surface of the semi-translucent polarizing film layer 20 can be detected by the glare detection unit 31 in the display control device 30. When a glare is detected on the surface of the semi-translucent polarizing film layer 20, the control unit 32 generates a driving signal to drive the display device 10 to display a non-black image at least in the glare compensation region $S_0$ so as to weaken the mirror effect of the semi-translucent polarizing film layer 20, and reduce glare intensity.

It should be noted that all of the drawings of the present disclosure are schematic illustrations of the above mentioned display control method, display control device, and display system including the display control device, which only reflects the structure involving inventive concept of the present disclosure. Other structures that are irrespective of the inventive point are well known, which are not shown in the drawings or are only shown partially.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A display control method comprising steps of:
    detecting whether a glare is presented on a surface of a semi-translucent polarizing film layer on an emergent light side of a display device; and
    generating a driving signal for driving the display device to display a non-black image at least in a glare compensation region in response to a glare being detected to be presented on the surface of the semi-translucent polarizing film layer; the glare compensation region corresponding to a glare region in the semi-translucent polarizing film layer in which a glare is presented.

2. The display control method according to claim 1, wherein the step of detecting whether a glare is presented on the surface of the semi-translucent polarizing film layer on the emergent light side of the display device comprises steps of:
    acquiring an image of the semi-translucent polarizing film layer on the emergent light side of the display device; and determining whether the acquired image has a region in which a brightness value of image is greater than or equal to a preset brightness value which is a critical brightness value indicating whether a glare is presented on the surface of the semi-translucent polarizing film layer.

3. The display control method according to claim 2, wherein the method further comprises:
acquiring a region parameter of the glare region; and
the step of generating a driving signal comprises generating a driving signal according to the region parameter of the glare region, the driving signal being used for driving the display device to display a non-black image in the glare compensation region and displaying a black image in regions other than the glare compensation region.

4. The display control method according to claim 3, wherein the step of generating a driving signal according to the region parameter of the glare region comprises:
generating a first driving signal and a second driving signal according to the region parameter of the glare region;
wherein the first driving signal is used for driving a part of a backlight module corresponding to the glare compensation region of a display panel to be turned on and the second driving signal is used for driving the display panel to display a non-black image in the glare compensation region, or
the first driving signal is used for driving the backlight module to be turned on and the second driving signal is used for driving the display panel to display a non-black image in the glare compensation region and display a black image in regions other than the glare compensation region.

5. The display control method according to claim 1, wherein the step of detecting whether a glare is presented on the surface of the semi-translucent polarizing film layer on the emergent light side of the display device comprises:
detecting a photoelectric current created by ambient light irradiated onto the surface of the semi-translucent polarizing film layer on the emergent light side of the display device; and
determining whether the photoelectric current is greater than or equal to a preset current value which is a critical current value indicating whether a glare is presented on the surface of the semi-translucent polarizing film layer.

6. The display control method according to claim 1, wherein the driving signal is used for driving the display device to display an image at least in the glare compensation region with a brightness value greater than or equal to 10 nits.

7. The display control method according to claim 1, wherein the driving signal is used for driving the display device to display a white image at least in the glare compensation region.

8. A display control device comprising:
a glare detecting unit configured to detect whether a glare is presented on a surface of a semi-translucent polarizing film layer on an emergent light side of a display device; and
a control unit configured to generate a driving signal for driving the display device to display a non-black image at least in a glare compensation region in response to a glare being detected to be presented on the surface of the semi-translucent polarizing film layer; the glare compensation region corresponding to a glare region in the semi-translucent polarizing film layer in which a glare is presented.

9. The display control device according to claim 8, wherein the glare detecting unit comprises:
an image acquiring module for acquiring an image of the semi-translucent polarizing film layer on the emergent light side of the display device, and
a brightness analysis module for determining whether the acquired image has a region in which a brightness value of image is greater than or equal to a preset brightness value which corresponds to a brightness value of the image when an intensity of ambient light irradiated onto the surface of the semi-translucent polarizing film layer is equal to a glare preset value.

10. The display control device according to claim 9, wherein the glare detecting unit further comprises a region analysis module for acquiring a region parameter of the glare region; and
wherein the control unit generates a driving signal according to the region parameter of the glare region, the driving signal being used for driving the display device to display a non-black image in a glare compensation region and displaying a black image in regions other than the glare compensation region.

11. The display control device according to claim 10, wherein:
the display device comprises a display panel and a backlight module, and
the control unit generates a first driving signal and a second driving signal according to the region parameter of the glare region; wherein:
the first driving signal is used for driving a part of the backlight module corresponding to the glare compensation region of the display panel to be turned on and the second driving signal is used for driving the display panel to display a non-black image in the glare compensation region, or
the first driving signal is used for driving the backlight module to be turned on and the second driving signal is used for driving the display panel to display a non-black image in the glare compensation region and display a black image in other region than the glare compensation region.

12. The display control device according to claim 8, wherein the glare detecting unit comprises:
a light sensor module for detecting a photoelectric current created by ambient light irradiated onto the surface of the semi-translucent polarizing film layer on the emergent light side of the display device; and
a signal processing module for determining whether the created photoelectric current is greater than or equal to a preset current value which is a photoelectric current value created when an intensity of ambient light irradiated onto the surface of the semi-translucent polarizing film layer is equal to a glare preset value.

13. The display control device according to claim 8, wherein the driving signal is used for driving the display device to display an image at least in the glare compensation region with a brightness value greater than or equal to 10 nits.

14. The display control device according to claim 8, wherein the driving signal is used for driving the display device to display a white image at least in the glare compensation region.

15. A display system comprising a display device, a semi-translucent polarizing film layer on an emergent light side of the display device and a display control device according to claim 8.

16. The display system according to claim 15, wherein it is a rearview mirror system.

\* \* \* \* \*